May 7, 1929.　　　　　R. H. RANGER　　　　　1,712,280
RADIO RECEIVING SYSTEM
Filed Dec. 28, 1922　　　2 Sheets-Sheet 2
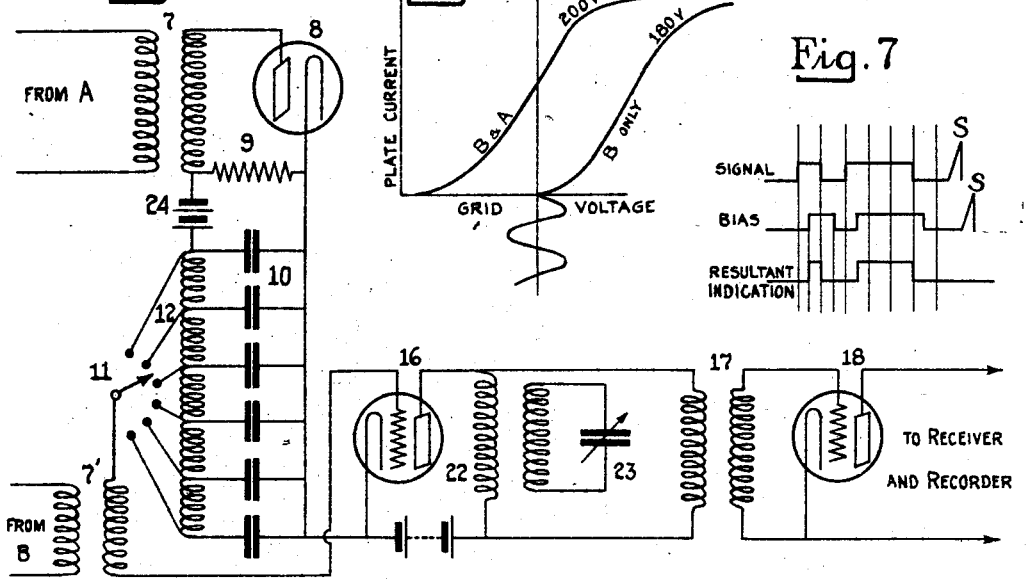
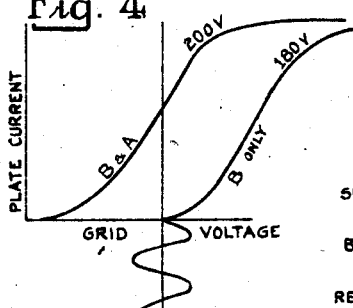
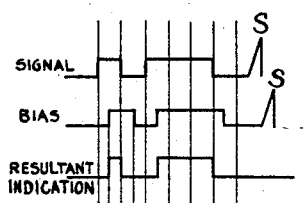
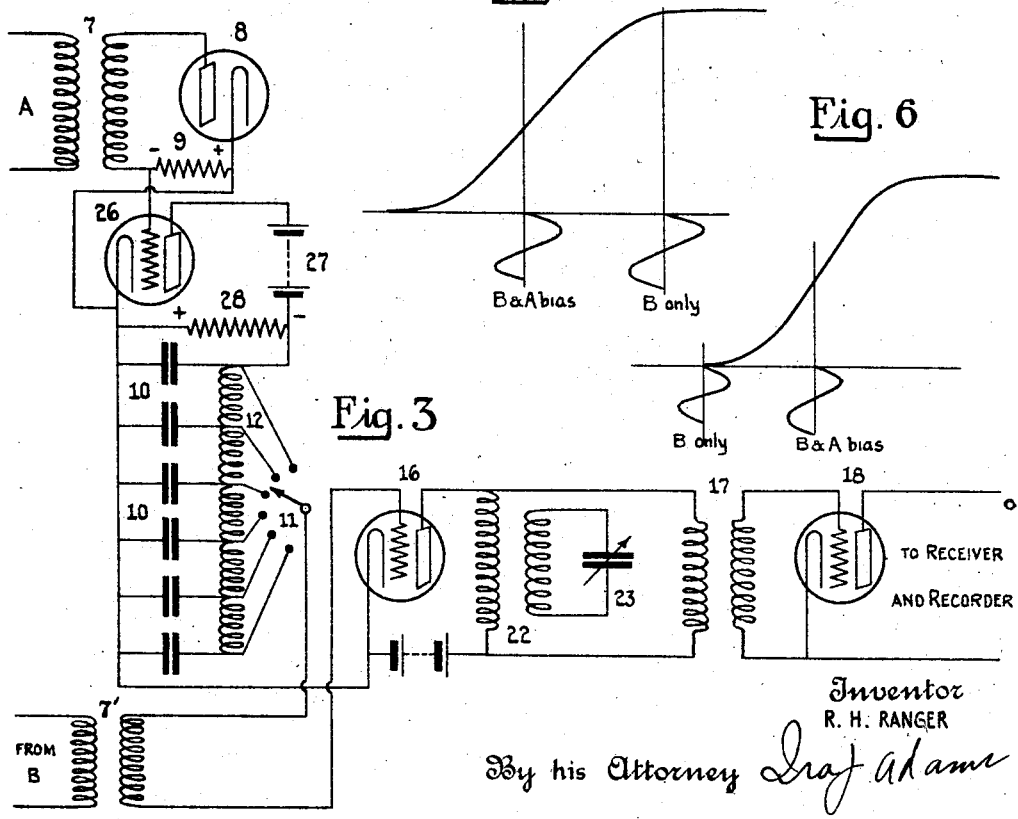
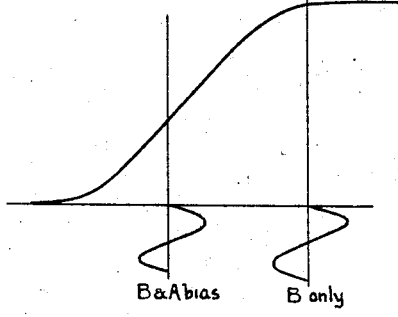
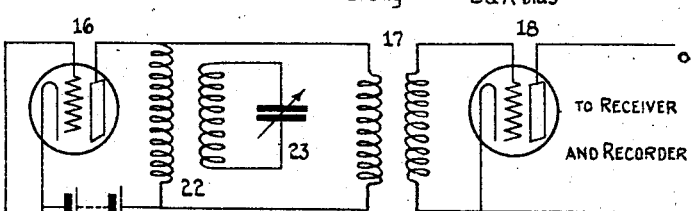
Inventor
R. H. RANGER
By his Attorney Patented May 7, 1929.

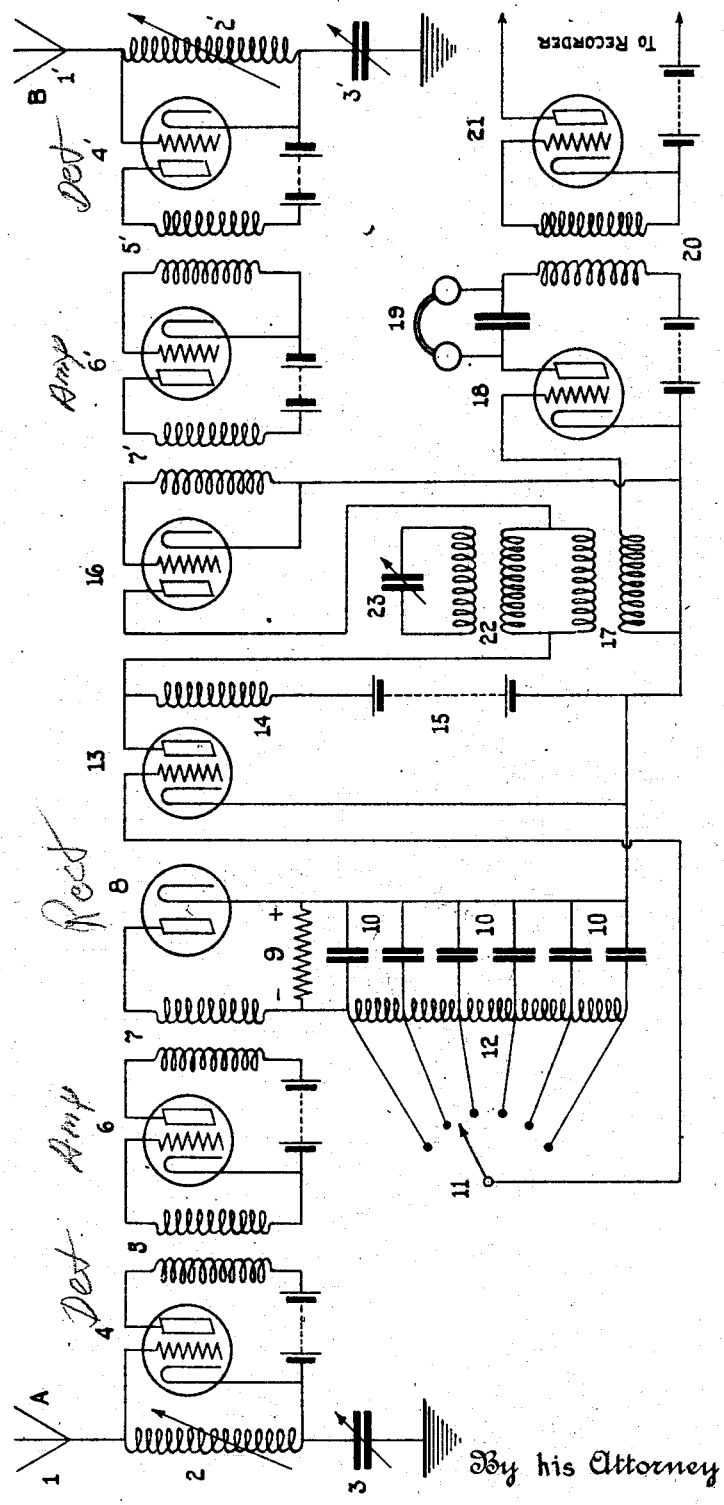

1,712,280

UNITED STATES PATENT OFFICE.

RICHARD HOWLAND RANGER, OF BROOKLYN, NEW YORK, ASSIGNOR TO RADIO CORPORATION OF AMERICA, A CORPORATION OF DELAWARE.

RADIO RECEIVING SYSTEM.

Application filed December 28, 1922. Serial No. 609,376.

This invention relates to means for reducing the effect on radio receiving apparatus of atmospheric discharges or so-called "static," as well as the disturbing effect produced by undesired transmitting stations: more particularly, it relates to such means embodying a plurality of receiving aerials having different physical or electrical characteristics with respect to the received electrical impulses.

These characteristics may be different in a number of ways as for instance, one receiving station may have a directional characteristic and the other a non-directional characteristic; or they may have dissimilar characteristics with respect to their distance from the transmitting station or again they may be located quite close together and have different electrical characteristics. After being received at these receiving stations the oscillations may be amplified if desired and then detected and carried over wire lines to some central recording station where they actuate suitable indicating or recording apparatus in accordance with my invention.

Many attempts have been made to provide arrangements which will eliminate or reduce the disturbing effect of atmospheric discharges. It has been suggested that it is possible to reduce interference by the use of two such receiving stations as are described above by a system of balancing in which the oscillations received from the two stations are combined in such a way that the undesired manifestations are balanced out and the desired oscillations are strengthened. So far as I am aware none of these arrangements has been successful under all conditions in practice, because it seems to be impossible to select apparatus in which the disturbing effects are always actually balanced out as required by the theory of these schemes.

In accordance with this invention I discard the method of balancing and provide a novel and useful method and arrangement for eliminating interference and this is done by controlling one signal by the other; that is to say, this method does not permit the addition of the voltages of the different stations to produce a signal. In accordance with my arrangement only the oscillations received upon one receiving aerial pass to the detector and indicating means. The oscillations received upon the other receiving aerial are utilized to bias the receiving means from an inoperative to an operative position. In other words, one signal receiving station is provided with detecting and indicating means associated therewith, this detecting and indicating means being normally inoperative but being rendered operative by signals received by another receiving station.

It is an object of this invention to provide interference reducing means which will eliminate or materially reduce the disturbing effects which are at best only partially eliminated by other known methods and which will, at the same time, be without effect on signals which it is desired to receive. It is another object of this invention to provide such means which shall be relatively inexpensive, and simple to construct and install, and which shall be reliable and positive in its action and simple in adjustment. It is a further object of this invention to provide such means which shall operate through the medium of ordinary vacuum tubes which are well known in the art. Other objects will appear from the specification.

My invention is shown by way of example in the following drawings in which

Figure 1 represents the preferred embodiment of my invention.

Figures 2 and 3 represent modifications thereof, and

Figures 4, 5, 6 and 7 are curves explaining the operation.

My invention will best be understood, both as to the practical form and as to the underlying theory by reference to the specification and drawings but its scope will be pointed out with particularity in the appended claims. However, I wish it understood that I am not limited to the arrangements disclosed but that changes and modifications may be made without departing from the underlying principles of my invention.

Referring to Figure 1, A and B respectively designate two receiving systems, each provided with aerials 1 and 1' having the usual tuning means comprising variable inductances 2 and 2' and variable condensers 3 and 3'. The voltages generated on the aerials 1 and 1' by received oscillations are impressed across the control element of vacuum tube detectors 4 and 4' although they may first be amplified if desired. In the output circuit of these detectors I provide coupling coils 5 and 5' for impressing the detected oscillations on the control elements of vacuum tube amplifiers 6 and 6'. Connected in the output circuit of the amplifier 6' I provide a coupling coil 7' whose secondary is connected through wire lines to the central recording station across the control electrodes of a three electrode vacuum tube 16, and connected in the output circuit of the amplifier 6 I provide a coupling coil 7 whose secondary terminals are connected in a similar way across the terminals of a Fleming valve rectifier 8. Connected in the circuit of this rectifier I provide a resistance 9. Connected to the negative end of this resistance 9 as shown I provide a relatively large inductance 12 provided with variable taps and a switch 11 for selectively connecting to any one of the taps from said inductance. Connected between said inductance and the cathode of the rectifier 8 I provide a plurality of condensers 10 in such manner that inductance 12 and condensers 10 constitute what is known as an artificial line. The impedance of this line is made to match the tube impedance to reduce reflection. The purpose of this artificial line will be explained later. The positive terminal of the resistance 9, designated in the drawing by the sign +, is connected to the filament of three electrode tube 13. The grid of this tube is connected to the blade of switch 11. The plate elements of tubes 13 and 16 are connected together, as shown in the drawing, and are energized by the battery 15 through a large inductance 14 which has also considerable resistance. Connected in the output circuit of the tube 16 I provide coupling coil 17 whose primary is shunted by coupling coil 22, the secondary circuit of which is closed through variable condenser 23. The secondary terminals of coupling coil 17 are connected to the control electrodes of the vacuum tube amplifier 18. In the output circuit of this tube I provide indicating means such as telephone receivers 19 and also a coupling coil 20 whose secondary is connected across the control electrodes of vacuum tube amplifier 21. The output current from amplifier 21 is of sufficient strength to operate a commercial form of recorder (not shown) which may be connected thereto in any suitable manner. The operation of the arrangement is as follows:

Let us for the moment neglect the effect of the receiving system B and consider only the system A. It will be apparent that by tuning inductance 2 and condenser 3, oscillations received may be brought to maximum intensity. These oscillations will then be detected in the detector 4 and amplified in amplifier 6 and impressed upon the plate and filament of rectifier 8. It will be obvious that as the current in rectifier 8 flows always in the same direction, that one end of the resistance 9 will always be positive with respect to the other end when a signal is received, and it will be seen that as the negative side of this resistance is connected to the grid of tube 13, whenever a signal is received upon the aerial 1, current will flow through the tube 8 and resistance 9 and the grid of tube 13 will receive a negative bias. The tube 13 is operated at such point on its characteristic that when no bias is put on the grid by the operation of rectifier 8 the plate circuit of tube 13 will draw considerable current from battery 15. When a signal is received upon A the resulting bias will give the grid a negative potential which is sufficient to practically stop the flow of plate current in tube 13. With this in mind, we shall now consider the effect of the signal received at B. As this system is identical with that of A as far as tubes 4' and 6' the operation of these will not be described. It is apparent, of course, that oscillations received on aerial 1' will be impressed on the grid and filament of the vacuum tube 16. Since the battery 15 supplies the plates of both of these tubes in parallel through large inductance 14, it will be seen that when no bias is placed on the grid of tube 13 approximately twice the current will flow through battery and inductance 14, which flows when the grid is biased as described. This battery in my preferred embodiment has a potential of approximately 220 volts. The potential drop in the inductance which also has considerable resistance where no bias is on the grid of tube 13 is about 40 volts leaving an effective potential upon the plates of 180 volts.

I operate the tube 16 at such a point on the characteristic as shown by Figure 4 that for a potential of 180 volts on the plate, the impressed voltage on the grid will not be sufficient to control the output of the tube. This is the condition which obtains when no signal is received at A. However, when a signal is received at A as previously described, the grid of tube 13 will receive a negative bias sufficient to stop the flow of plate current in this tube which will, therefore, decrease the current from battery 15 to approximately half its value. The voltage drop through inductance 14 will then decrease from approximately 40 volts to approximately 20 which will raise the potential of plate 16 to approximately 200 volts.

Referring again to Figure 4, it will be seen that under such conditions amplifier 16 will be operative and the impressed signal will be amplified by tube 16 and passed on by means of coupling coil 17 to the control element of tube 18, from which it may be passed on to amplifier 21 and recorded by any suitable recorder. While I have shown a frequency trap connected across coupling coil 17 it is not necessary to explain in detail the operation of this frequency trap which is disclosed and claimed in my copending application Serial Number 585,352 filed Aug. 31, 1922. It will be sufficient for the purpose of this application to say that this frequency trap as shown comprises a coupling coil 22 and variable condenser 23 and its action is substantially like that of a parallel circuit. By tuning the condenser 23 it is possible to select the signals of desired frequency in the primary coupling coil 17 since coupling coil 22 will offer an infinite impedance to substantially only a single frequency. While I have shown this frequency trap, it will be obvious that the same may be omitted without affecting my invention, and although I have shown no tuning means other than the variable inductance 2 and 2' and the variable condenser 3 and 3' it will be obvious that I may utilize any suitable means. As such other means are old and well understood in the art it is not thought necessary to show or describe them.

A modification of this arrangement is shown in Figure 2. In this figure it will be understood that aerials, detectors and amplifiers are provided as in Fig. 1 and that the leads from these are those which are labeled "from A" and "from B". These leads are connected to coupling coils 7 and 7' respectively. The secondary of coupling coil 7 is connected as shown to the plate of a Fleming valve rectifier 8 and to the negative terminal of resistance 9, the positive terminal of this resistance is connected to the filament of the valve 8 and to the filament of vacuum tube 16. Connected to the negative terminal of resistance 9 I provide an additional battery 24 and in series with this battery the artificial line as in Fig. 1. Also connected to swith 11 I provide the secondary of coupling coil 7' whose other terminal is connected to the grid of amplifier 16. The operation of this modification will be readily understood by referring to Figure 5. The battery 24 provides a positive bias on the grid of the tube 16 of such value that signals arriving from station B will not affect amplifier 16. However, if signals are also received from station A at the same time the positive bias upon the grid of the tube 16 will be decreased through the action of rectifier 8 and the axis of potential of the grid will be displaced as shown in Figure 5 to such point that amplifier 16 will then function and signals will be passed on to amplifier 18 and may then be received and recorded as in Figure 1.

Still another modification is shown in Figure 3. As in Figure 2 the leads from signals A and B are led to coupling coils 7 and 7'. The secondary terminals of coupling coil 7 are connected one to the plate of Fleming valve 8 and the other to one terminal of resistance 9, the other terminal of which is connected to one filament terminal of valve 8. The negative terminal of resistance 9 is connected to the grid of tube 26. I provide a battery 27 and resistance 28, one terminal of the secondary of coupling coil 7' being connected to the negative terminal of resistance 28 thru switch 11 and the artificial lines and the other terminal connected to the grid of tube 16. The positive terminal of resistance 9 is connected to the filaments of tubes 16 and 26. When a signal is received from station A the grid of tube 26 will be made negative through its connection to the negative terminal of resistance 9. This is sufficient to stop the flow of plate current in tube 26 and allows the grid of tube 16 to lose the negative bias which it is given by reason of its connection to the negative side of resistance 28.

Referring to Figure 6 it will be seen that this moves the grid potential from an inoperative point on the characteristic to an operative point and it will therefore be apparent that signals from B will then be amplified and may be received on the receiver or recorder or both if desired.

With these arrangements it will be seen that should static strike stations A and B simultaneously the indicating apparatus will respond thereto. While this is not so apt to occur if the receiving stations are located at a considerable distance apart, it may occur if the receiving stations are relatively close together and it is desirable to eliminate such a possibility. This can be done as follows:

Let switch 11 be adjusted so that the potential drop through resistance 9 is not impressed directly across filament and grid of tube 13 but must pass through the artificial line made up of inductance 12 and condensers 10. It is well known that there is a time lag introduced by an artificial line depending on its characteristics. The inductance 12 and condensers 10 are so chosen that by manipulation of switch 11 this time lag may be increased or decreased.

Referring to Figure 7 it will be shown how the introduction of this time lag will eliminate short pulses of static striking both aerials simultaneously. Signals from station B will be impressed upon tube 16 according to the curve designated as "signal" in Fig. 7. In this case the signal is a dot and a dash. It will be apparent, of course, that the potential variation across the resistance 9, which is the starting point of the artificial line, will occur at the same time but the lag which is introduced by this line will shift the time of this potential difference on the grid of the tube 13 to the position shown in the curve designated as "bias" in Fig. 7. That is to say, since signals will go through from B to the indicating means only when the grid of tube 13 is biased to a negative potential the signal given by the indicator will be the resultant indication in Fig. 7. As is evident from the curve, this resultant is the common portion of the two curves above. It will now be seen that short pulses of static striking the two antennæ simultaneously will be dephased, as shown by points S, by the time lag of the bias line and will, therefore, not affect the indicator. The effect of this lag is to cut down the duration of signals and increase the spacing periods, but this will not interfere with reading the signals.

Having described my invention I declare that what I claim is

1. A method of reducing interference in the reception of radio signals, which consists in deriving two portions of desired signal energy in such manner that the effects of incidental undesired energy are substantially different, impressing a voltage derived from one of said portions of signal energy upon the input circuit of a three-electrode thermionic relay, normally limiting the plate potential of said relay to render the said relay unresponsive to desired signal potential, deriving a potential from said second portion of signal energy, and impressing such potential upon the plate member of said relay in a manner to partially neutralize the effect of said previously recited limited potential on the said plate member and render said relay responsive to signal potentials of the first portion of said signal energy.

2. The method of reducing interference in the reception of radio signals with a thermionic relay connected with two aerials of different characteristics, which consists in receiving the same signal on said aerials, impressing signal potential derived from one aerial on said thermionic relay, normally biasing said relay in such a manner as to render the said relay normally unresponsive to such signal potential, and impressing on said relay a potential derived from signals received on the other of said aerials at the expiration of a predetermined time after the reception of the signal on the last mentioned aerial.

3. The method of reducing interference in the reception of radio signals which consists in receiving the desired signal on two aerials, impressing a potential derived from signals received on one aerial between the grid and filament of a vacuum tube relay, impressing the potential derived from signals received on the second aerial between the filament and plate of the said relay in such a way that a change in the plate potential, due to signals received on said second aerial, takes place, and controlling the time of said amplification of potential due to signals received on the second aerial so that the said action takes place only at the expiration of a predetermined time after the reception of the signal on the last mentioned aerial.

4. In radio signalling apparatus, two aerials, indicating means responsive to signals received on one of said aerials, means coupled to the other of said aerials for controlling the response of said indicating means in accordance with impulses striking the second of said aerials, and means for causing the action of the controlling means to have a time lag with respect to impulses which strike said second aerial.

5. In radio signalling apparatus, two aerials, indicating means responsive to signals received on one of said aerials, means for rendering said indicating means normally inoperative, controlling means connected to the other of said aerials for rendering said indicating means operative under the control of impulses received on said second aerial, and means for causing the action of said controlling means to lag behind the response of said second aerial to impulses received thereon.

6. In radio signalling apparatus, the combination of a thermionic relay comprising an anode, a cathode and a control electrode, means for impressing desired signal voltage between the cathode and control electrode of said relay and means controlled by desired signal energy impressed between the cathode and anode for varying the voltage between said electrodes in a manner to cause said relay to vary from signal unresponsive to responsive condition upon the receipt of signals.

7. In radio signalling system, the combination of a three electrode thermionic relay comprising an anode, a cathode and a control electrode, means for impressing desired signal voltage between the cathode and control electrode of said relay, means for applying a voltage between said cathode and anode of such value as to render said relay unresponsive to impressed signal voltage and means controlled by desired signal energy for varying said voltage to render said relay responsive.

8. In a radio signalling system, the combination of a three electrode thermionic relay comprising an anode, a cathode and a control electrode, means for impressing desired signal voltage between the cathode and the control electrode of said relay, means for impressing between said cathode and the anode a voltage normally of such value as to render said relay unresponsive to impressed signal voltage and means controlled by desired signal energy for varying said voltage to render said relay responsive.

9. In a radio signalling system, the combination of a three electrode thermionic relay comprising an anode, a cathode and a control electrode, means for impressing desired signal voltage between the cathode and the control electrode of said relay, means for impressing between said cathode and anode a voltage normally of such value as to render said relay unresponsive to impressed signal voltage and comprising a source of electromotive force having an impedance of substantial value in series therewith, a load circuit connected across said source of electromotive force and said impedance and drawing current from said source, and means for cutting off the flow of current in said load circuit, whereby the voltage impressed between the cathode and said one electrode is varied to render said relay responsive.

10. In a radio signalling system, the combination of a three electrode thermionic relay comprising an anode, a cathode and a control electrode, means for impressing desired signal voltage between the cathode and the control electrode of said relay, means for impressing between said cathode and the anode of said relay a voltage normally of such value as to render said relay unresponsive to impressed signal voltage, and comprising a source of electromotive force having an impedance of substantial value in series therewith, a load circuit connected across said source of electromotive force and said impedance and drawing current from said source, and means for cutting off the flow of current in said load circuit, whereby the voltage impressed between the cathode and anode of said relay is varied to render said relay responsive.

11. In radio signalling apparatus, the combination of a three electrode thermionic relay comprising an anode, a cathode, and a control electrode, means for impressing desired signal voltage between the cathode and control electrode of said relay, means for impressing between said cathode and the anode of said relay a voltage normally of such value as to render said relay unresponsive to impressed signal voltage and comprising a source of electromotive force and an impedance of substantial value in series therewith, a second three electrode thermionic relay having its cathode and anode connected across said source and said impedance and drawing current therefrom, and means for varying the current flow through said second thermionic relay to vary the voltage between the anode and cathode of the first relay to render the same responsive.

12. In radio signalling apparatus, the combination of a three electrode thermionic relay comprising an anode, a cathode, and a control electrode, means for impressing desired signal voltage between the cathode and control electrode of said relay, means for impressing between said cathode and the anode of said relay a voltage normally of such value as to render said relay unresponsive to impressed signal voltage and comprising a source of electromotive force and an impedance of substantial value in series therewith, a second three electrode thermionic relay having its cathode and anode connected across said source and said impedance and drawing current therefrom, means for varying the current flow through said second thermionic relay to vary the voltage between the anode and cathode of the first relay to render the same responsive, and means for controlling said last named means in accordance with desired signals.

13. In radio receiving apparatus, the combination of a pair of three electrode thermionic relays, each comprising an anode, a cathode and a control electrode, and having their anodes and cathodes connected together, a common means for energizing the anode-cathode circuits of each of said relays comprising a source of electromotive force and an impedance in series therewith, means for impressing desired signal voltage upon the control electrode circuit of one of said relays, and means for impressing upon the control electrode circuit of the other of said relays a uni-directional potential derived from desired signal energy, said relays and said source and said impedance being so constructed and arranged that the first of said relays is unresponsive to impressed signal voltage, except when said uni-directional potential is impressed upon the other of said relays.

14. In radio signalling apparatus, the combination of a thermionic vacuum tube relay having an anode, a cathode and a control electrode, means for impressing between the cathode and control electrode of said relay an electromotive force comprising a component of periodic fluctuations desired to be repeated and a component of non-periodic or differently periodic fluctuations desired to be suppressed, means connected between the cathode and anode for varying the voltage between said electrodes in a manner to cause said relay to vary from responsive to unresponsive condition and means for controlling said last mentioned means to cause said relay to pass into responsive condition substantially in synchronism with the occurrence of the component of desired fluctuations.

15. In radio signalling apparatus, the combination of a thermionic vacuum tube relay having an anode, a cathode and a control electrode, means for impressing between the cathode and control electrode of said tube an electromotive force comprising a component of periodic fluctuations desired to be repeated and a component of non-periodic or differently periodic fluctuations desired to be suppressed, means connected between the cathode and anode for varying the voltage between said electrodes in a manner to cause said relay to vary from responsive to unresponsive condition and means for controlling said last mentioned means to cause said relay to pass into operative condition substantially in accordance with the component of desired fluctuations, but out of time coincidence therewith, said last mentioned means comprising means for regulating the amount of such time displacement.

16. In a radio signalling system, the combination of a pair of means for collecting signal energy, a thermionic relay connected to one of said energy collecting means for repeating signal oscillations collected thereon, means for varying the operating characteristic of said relay to cause said relay to vary from responsive to unresponsive condition and means connected to the other of said signal energy collecting means for controlling the operation of said last named means.

17. In a radio signalling system, the combination of a pair of means, differing in at least one impedance characteristic, for collecting signal energy, a thermionic relay connected to one of said energy collecting means for repeating signal oscillations collected thereon, means for varying the operating characteristic of said relay to cause said relay to vary from responsive to unresponsive condition, means connected to the other of said signal energy collecting means for controlling the operation of said last named means and means interposed between said controlling means and said varying means for causing the operation of the varying means to lag behind the operation of the controlling means.

18. A method of operating a thermionic vacuum tube relay having an anode, a cathode and a control electrode which consists in impressing between the said cathode and the control electrode an electromotive force having a component of desired fluctuations and impressing between the cathode and anode a voltage of such value as to render said relay responsive to variations of electromotive force impressed thereon substantially only at such times as the component of desired fluctuations is present in the electromotive force impressed between said cathode and said control electrode.

19. A method of operating a thermionic vacuum tube relay having a cathode, an anode and a control electrode which consists in impressing between said cathode and said control electrode an electromotive force having a component of fluctuations desired to be repeated and impressing between said cathode and anode a uni-directional voltage of such value as to render said repeater responsive to said desired fluctuations only at such times as said desired fluctuations are present in the electromotive force impressed between said cathode and said control electrode.

20. A method of operating a three element thermionic relay having an anode, a cathode and a control electrode which comprises impressing between said cathode and said control electrode an electromotive force comprising fluctuations desired to be repeated, and impressing between said cathode and said anode a uni-directional potential of such value as to render said relay responsive to desired impressed fluctuations substantially at such times only as said deired fluctuations are impressed between said cathode and said control electrode.

21. A method of operating a three electrode thermionic relay having an anode, a cathode and a control electrode which consists in impressing between said cathode and said control electrode variations of electromotive force comprising a component desired to be repeated and intermittently impressing between said cathode and one of said electrodes a uni-directional potential, of such value as to render said repeater responsive to desired fluctuations, and at such times with respect to desired fluctuations that said impressed potential exists between said electrodes during a portion of the time in which said desired fluctuations are impressed between said cathode and said control electrode.

22. A method of operating a three electrode thermionic relay comprising an anode, a cathode and a control electrode which consists in impressing between said cathode and said control electrode variations of electromotive force comprising a component desired to be repeated and impressing between said cathode and one of said electrodes a uni-directional potential, of such value as to render said relay responsive to desired fluctuations, and at such times with respect to desired fluctuations that said impressed potential exists between said electrodes during a portion only of the time in which said desired fluctuations are impressed between said cathode and said control electrode.

23. The method of avoiding effects of interference in radio signalling, which includes, separately receiving two distinct signal impulses from the same signal, detecting and amplifying each of said separately received signal impulses, transforming one of said signal impulses, varying the transformation of said signal impulses in accordance with the other of said received signal impulses, and recording the first of said signal impulses.

24. The method of avoiding the effects of interference in radio signalling systems, which includes, separately receiving two series of impulses from the same signal, detecting and amplifying each of said received signal impulses, relaying one of said series of received signal impulses, varying the relaying action of said signal impulses in accordance with the other of said series of received signal impulses, and recording the first of said received signal impulses.

25. The method of avoiding effects of interference and static in radio receiving systems, which includes, separately receiving two series of signal impulses of the same signal, amplifying one of said series of signal impulses, varying the amplification of said first series of signal impulses in accordance with the second series of signal impulses, controlling the time period of amplification of said first series of signal impulses by the second series of signal impulses, and recording the first series of signal impulses.

26. The method of avoiding effects of interference and static in radio signalling system, which includes, separately receiving two independent trains of signal impulses from the same signal source, detecting and amplifying each of said trains of signal impulses, transforming one of said series of signal impulses, controlling the ratio of transformation of the first train of signal impulses in accordance with the second train of said signal impulses, delaying the time of controlling the transformation ratio of said first series of signal impulses a predetermined period of time to shorten the responsive period of said first train of signal impulses, and recording the first train of said transformed signal impulses.

RICHARD HOWLAND RANGER.